United States Patent [19]

Russo

[11] 4,002,580

[45] Jan. 11, 1977

[54] FIRE-RETARDANT POLYURETHANE

[75] Inventor: Robert Victor Russo, Brooklyn, N.Y.

[73] Assignee: GAF Corporation, Wayne, N.J.

[22] Filed: Sept. 12, 1974

[21] Appl. No.: 505,359

[52] U.S. Cl. .................... 260/2.5 AJ; 260/2.5 AM; 260/45.7 PS; 260/45.7 P; 260/77.5 AR; 260/77.5 SS

[51] Int. Cl.$^2$ ................ C08G 18/14; C08G 18/30; C08G 18/38; C08K 5/53

[58] Field of Search ............... 260/2.5 AJ, 2.5 AM, 260/77.5 AR, 77.5 SS, 45.7 PS, 45.7 P

[56] References Cited

UNITED STATES PATENTS

| | | | |
|---|---|---|---|
| 3,738,953 | 6/1973 | Anorga | 260/2.5 AM |
| 3,772,222 | 11/1973 | Steward | 260/2.5 AJ |
| 3,779,953 | 12/1973 | Papa | 260/2.5 AJ |
| 3,812,047 | 5/1974 | D'Alelio | 260/2.5 AM |
| 3,862,879 | 1/1975 | Barron | 260/2.5 AM |
| 3,919,166 | 11/1975 | Brachman | 260/2.5 AM |
| 3,933,690 | 1/1976 | D'Alelio | 260/2.5 AM |

FOREIGN PATENTS OR APPLICATIONS

| | | |
|---|---|---|
| 2,255,971 | 5/1973 | Germany |
| 1,305,036 | 1/1973 | United Kingdom |

*Primary Examiner*—C. Warren Ivy
*Attorney, Agent, or Firm*—W. C. Kehm; J. J. Ward

[57] ABSTRACT

Polyurethanes incorporating 2,3-dibromobutenediol-1.4, as a reactive fire-retardant component and chain extender, in combination with organophosphorous compounds, to effect a decrease in the amount of brominated diol necessary, and thus in the bromine content of the resin, to provide fire-retardant polyurethane products manifesting significantly reduced smoke emission in the event of combustion and other enhanced physical properties.

23 Claims, No Drawings

FIRE-RETARDANT POLYURETHANE

BACKGROUND OF THE INVENTION

Polyurethanes incorporating fire-retardant compositions are well-known. Urethane polymers incorporating 2,3-dibromo-2-butenediol-1,4 as a chain extender and reactive fire-retardant component have also been suggested more recently and this diol has been found to impart particularly advantageous fire-retardant qualities.

However, it has been proposed heretofore to secure optimum fire retardancy, particularly in foamed polyurethane resins, that the bromine component and phosphorus component, from whatever source derived, be present in a weight percent ratio of one to the other of $P + Br/10 = 1.5$. This ratio, while providing foams incorporating a desirable fire retardancy and other desirable physical and mechanical properties, involves the emission of a substantial volume of smoke, in the event combustion occurs, and substantial expense, as well.

If the smoke emission properties of polyurethanes could be reduced, together with the cost of manufacture, and the mechanical properties of these polymers retained and enhanced, it is obvious that a long-felt need would be fulfilled and, consequently, a significant discovery effected.

This need exists particularly with respect to polyurethane foams and most particularly with respect to flexible slab and high-resilience polyurethane foams where the flammability and smoke-emission properties of the foams which are used, particularly in bedding and furniture applications and in automotive deep-molded seat cushioning, is a matter of obvious concern and increasing governmental interest. At the same time, an improvement of the mechanical and physical properties of these foams including high resilience and load ratio, high tensile strength, higher elongation and greater tear strength together with significant improvement in hysteresis and fatigue would constitute a significant and unexpected advantage prized by purchasers and users of these foams.

SUMMARY OF THE INVENTION

It is, therefore, a principal object of this invention to provide novel polyurethane resins incorporating a propensity for significantly reduced smoke emission.

It is a further object of this invention to provide polyurethane and, particularly, polyurethane foams of enhanced mechanical and physical properties; and to produce these foams in an inexpensive manner.

It is a particular object of this invention to provide improved flexible slabstock foams and high-resilience, cold-cured polyether urethane foams incorporating the advantages recited herein in an economically expedient "one-shot" process.

Other and additional objects and advantages of the present invention will become more apparent from the following description.

Accordingly, it has now been discovered that polyurethane resins, including slabstock foam and high-resilience, cold-cured polyether urethane foams of significantly reduced smoke emission properties and other enhanced mechanical properties, may be prepared by a one-shot process that incorporates reduced amounts of 2,3-dibromo-2-butenediol-1,4 as a chain extender and reactive fire-retardant component in combination with certain organophosphorus compounds.

DESCRIPTION OF THE PREFERRED EMBODIMENTS

The polyurethane resins prepared according to the invention are those incorporating as a chain extender and reactive fire-retardant component, 2,3-dibromo-2-butenediol-1,4, and in combination therewith a compound of the formula:

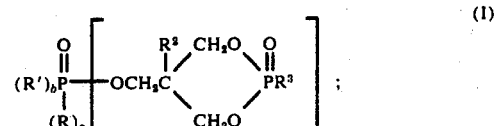

(I)

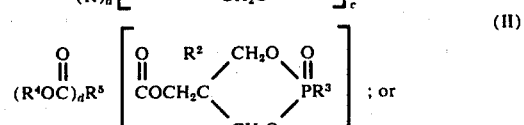

(II)

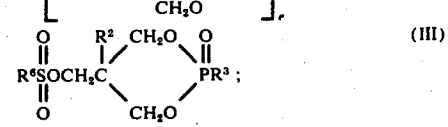

(III)

and mixtures thereof, where in Formula I each of $a$ and $b$ has a value of 0 to 2 inclusive; $c$ is an integer of 1 to 3 and the sum of $a$, $b$ and $c$ is 3; each of R and R' is an alkyl, alkoxy, aryloxy, alkaryl, alkaryloxy, aralkyl, aryloxyalkoxy, or aralkoxy radical, wherein each of said alkyl radicals may contain a hydroxyl moiety; and each of said aryl radicals may contain an hydroxy or chlorine group and preferably a single such substituent; $R^2$ is an alkyl, hydroxyalkyl, or aryl group; $R^3$ is either an alkyl or a hydroxyalkyl radical; and, in Formula II, $d$ has a value of 0 to 2 inclusive, $e$ is an integer of from 1 to 3 inclusive and the sum of $d$ and $e$ does not exceed 3; each of $R^2$ and $R^3$ has the value recited above with respect to Formula I; $R^4$ is an alkyl, aryl, alkaryl, aralkyl or aryloxyalkyl group wherein the aryl radical may contain chlorine or hydroxyl groups; $R^5$ is an alkyl, alkylene, aryl or arylene radical and the aryl or arylene group may be further substituted by a chlorine or hydroxyl group; and $R^6$ is an alkyl, aryl, alkylaryl or arylalkyl radical, in which any aryl moiety present may be hydroxyl or chlorine substituted.

The ratio of bromine and phosphorus in the polyurethane resins prepared as described herein is determined by the formula: $P + Br/10 \cong 0.1$–$1.0$, and more particularly, $P + Br/10 = 0.1$ to $1.0$, wherein P and Br represent the percentages by weight of phosphorus and bromine respectively in the finished polymer (corrected for gas loss) to produce the desired polyurethane. Thus expressed, the weight percent of phosphorus incorporated by the foregoing compositions of general formulae I, II and III and one-tenth the weight percent of bromine derived from the brominated diol chain extender and fire retardant of the invention does not exceed a sum total of about 1.0, that is, $P + Br/10$ equals a maximum value of no more than 1.0. Accordingly, the upper limit of phosphorus and bromine present should not exceed 0.95 weight percent and 9.5 weight percent respectively. The weight percentage of phosphorus and one-tenth the weight percent of bromine present in any polyurethane formulation prepared in accordance with the practice herein described cannot at the same time be less than about 0.1. Thus, the weight percent of phosphorus should not be lower than 0.05, and that of bromine, not less than 0.5 in the foregoing formula.

A significant reduction in smoke emission is attained as a result relative to those polyurethane products which characteristically, for optimum fire retardancy, have heretofore had a total phosphorus and bromine content defined by the relationship: P + Br/10 = 1.5; wherein, by way of illustration, P is equal to 1 weight percent and Br is equal to 5.0 weight percent; or, if no phosphorus is present, the total bromine is 15 weight percent. The phosphorus-containing compounds conventionally employed heretofore in these latter ratios have been the phosphates, tris-chloroethyl phosphate and tris-dichloropropyl-phosphate.

The present invention has particular application to flexible cellular polyether and polyester urethane foams and most particularly those produced by a cold cure. A preferred value for the formula P + Br/10 is within the range of 0.32 to 0.36. In a particularly preferred manifestation of the relationship according to the present invention, the phosphorus content is reduced to about 0.14 weight percent and the bromine content still further reduced to about 2.0 weight percent (equivalent to a value of 0.2 in the foregoing formula) for a value of about 0.34 in the foregoing formula.

The fire-retardant polyurethanes (which are intended to include polyureas as well) for use herein comprise broadly (a) an unhalogenated organic compound containing active hydrogen-containing groups reactive with —NCO groups; (b) an organic polyisocyanate; (c) 2,3-dibromo-2-butenediol-1,4; (d) a phosphorus-containing compound of Formula I, II or III above and optionally other standard additives and components.

The practice of the invention has application to spandex polyurethane elastomers, coatings, flooring materials, elastoplastic application in, for example, millable gums, thermoplastic urethane elastoplastics, intermediate molecular weight, actively terminated polymer systems used in coatings, and the like. The practice of the invention has a preferred application, however, as indicated above, to polyurethane foams including rigid and flexible foams; and particularly significant value as presently contemplated, when applied to flexible slabstock and high resilience foams.

The terms "urethane polymers," "urethane resins"or the like, as employed throughout this specification include products produced by the reaction of a polyisocyanate with polyfunctional active hydrogen-containing compounds. The active hydrogen-containing compounds generally are polyethers or polyesters but encompass other materials containing active hydrogen groups such as caprolactones, polyamines, polyamides, polyacetals and polythiols. These urethane polymers occur, as indicated above, in the form of rubbers, films, lacquers or flexible or stiff fibers, and, for purposes of this invention, most significantly as foamed cellular resins, having the recurring unit of

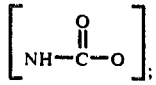

and where they occur as poly (ureaurethanes) produced from an amine reactant having as a repeating unit, the urea moiety,

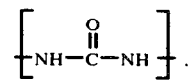

The polyurethanes of the invention may have molecular weights of as little as 650 and as high as 15,000 and, indeed, substantially higher. Flexible slabstock foams of conventional resiliency and composition, except as to the properties and components introduced by the practice of this invention, will have a molecular weight of about 10,000 to about 15,000 or more; and high-resilience foams, a molecular weight of no less than 15,000.

The active hydrogen-containing organic compound provides the soft segment of these polyurethanes and is generally a polyether, polyester, polyacetal, polyamine, polyamide, polystearamide or the like. The polyethers and polyesters are preferred.

The polyethers employed are those derived from the condensation of one or more moles of an alkylene oxide with preferably one or more moles of a high molecular weight polyhydric alcohol. Illustrative of the active hydrogen-containing groups are —OH, —COOH, —NH$_2$, —SH, = NH, —CSNH$_2$, —CONH$_2$, —SO$_2$NH$_2$ and —SO$_2$OH.

The preferred polyols employed for reaction with the NCO groups of the hard segment necessary to production of a polyurethane and particularly the slabstock foams, including rigid, flexible and high-resilience foams, are those having a molecular weight of 3,000 to 7,000. The flexible slabstock foams for conventional applications, and as distinguished from high-resilience foams, for example, incorporate polyols having a molecular weight most desirably of from about 3,000 to 3,500 and characterized by a hydroxyl number of about 40 to 60; the high-resilience foams, polyols having a molecular weight of from about 4,000 to 7,000 and characterized by a hydroxyl number of about 20 to 60.

As is well known to those skilled in the art to which this invention pertains, the hydroxyl number is defined as the number of milligrams of potassium hydroxide required for the complete neutralization of the hydrolysis product of the fully acetylated derivative prepared from 1 gram of polyol. The hydroxyl number can be defined by the equation:

$$OH = \frac{56.1 \times 1000 \times f}{MW}$$

Where
  OH = hydroxyl number of the polyol;
  $f$ = average functionality, that is, the average number of hydroxyl groups per molecule of polyol; and
  MW = average molecular weight of the polyol.

The preferred polyols, where slabstock and high-resilience foams are being prepared, are the triols which form the whole or a major proportion of the polyhydric reactant condensed with the alkylene oxide component. The preferred alkylene oxides are, for example, ethylene oxide, propylene oxide, butylene oxide, styrene oxide and amylene oxide.

Polyhydric polythioethers may also be employed as well as other polyhydric polyalkylene ethers secured from condensation of one or more moles of an alkylene oxide alone or together with a polyhydric alcohol as well as those obtained from tetrahydrofuran and epihalohydrins such, for example, as epichlorohydrin.

It is also possible to prepare polyhydroxy polyalkylene ethers suitable for use in accordance with the present invention by reacting alkylene oxides such as those listed herein with aliphatic, hydroaromatic and aromatic polyfunctional amines, alcohols or mixtures, such as, for example, ethanolamine, diethanolamine, ethylene diamine, and the like, as well as polycarboxylic acids such as adipic acid; hydroxy carboxylic acids such as recinoleic acid, polycarboxylic acid amines such as, for example, pyridine 2,3-dicarboxylic acid and/or polycarboxylic acid sulphonamides, such as succinic acid disulphonamide, and the like, and mixtures thereof.

In addition to the foregoing, any suitable polyhydric-polythioether may be used in the production of these polyurethanes by reaction with a polisocyanate. For example, such polyhydric-polyalkylene ethers as set forth above with a thioether glycol, for example, thiodiglycol, 3,3'-dihydroxy-propylsulfide, 4,4'-dihydroxybutylsulfide, 1,4-($\beta$-hydroxyethyl) phenylenedithioether, and the like.

The polyethers desirably employed in the preparation of the flexible, including high-resilience, foams of the invention are, by way of further illustration, the unhalogenated commercially available high-molecular weight poly (oxypropylene) derivatives of polydric alcohols, for example, poly (oxypropylene) ethers of glycerol, trimethylolpropane, 1,2,6-hexanetriol, and sorbitol. Particularly preferred polyols for use in preparation of high-resilience slabstock foams are the primary end-capped (ethylene oxide) triols having a molecular weight of, as indicated above, about 4,000 to 7,000, and particularly about 4,500.

Other polyols employed in preparing the polyethers of the invention are 1,4-butanediol, 1,3-butanediol, dodec-9,10-ene-1,2-diol, thioglycol, 1,6-hexame-diol, thiodiglycol, 2,2-dimethyl propane-1,3-diol, 1,18-octadecane diol, 2-ethyl hexane-1,3-diol, 2,4-dimethyl-2-propyl heptane-1,3-diol, 2-butene-1,4-diol, 2-butyne-1,4-diol, diethylene glycol, triethylene glycol, dipropylene glycol, pentaerythritol, hexahydropyrocatechol, 4,4'-dihydroxydicyclohexyl dimethylmethane and the like, and mixtures thereof.

The alkylene oxide normally contains from 2 to 5 carbon atoms, in any event, and is condensed, advantageously, with from about 5 to about 30 moles per functional group of the polyol initiator. Illustrative processes for preparation of polyhydric polyalkylene ethers for use herein include those described in U.S. Pat. No. 3,009,939, U.S. Pat. 3,061,625 or that disclosed in the *Encyclopedia of Chemical Technology*, Volume 7, pages 257, 262, Interscience Publishers (1951).

Other preferred high molecular weight polyols are so-called polymer/polyols including styrene-acrylonitrile-polypropylene oxide copolymers sold by Union Carbide Corporation, 270 Park Avenue, New York, New York, under the trade name designations NIAX Polyol 32–33, NIAX Polyol 31–28 and NIAX Polyol 34–28. The foregoing include polypropylene oxides of about 4,000 to 5,000 molecular weight and include poly (oxypropylene) vinyl copolymers having molecular weights of about 4,500 and a triol content of about 70 weight percent and a diol content of about 30 weight percent.

The polyesters which are employed in accordance with the present invention can be any suitable linear or branched polyester, generally an alcoholic hydroxy terminated polyester obtained by the reaction of a polycarboxylic acid and polyhydric alcohol. Any suitable polycarboxylic acid may be used such as, for example, oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, $\alpha$-hydromuconic acid, $\beta$-hydromuconic acid, $\alpha$-butyl-$\alpha$-ethylglutaric acid, $\alpha,\beta$-diethylsuccinic acid, isophthalic acid, terephthalic acid, hemimellitic acid, trimellitic acid, trimesic acid, phthalic acid, tetrachlorophthalic acid, mellophanic acid, prehnitic acid, pyromellitic acid, benzenepentacarboxylic acid, 1,4-cyclohexanedicarboxylic acid, 3,4,9,10-perylenetetracarboxylic acid and the like, and mixtures thereof.

Any suitable polyhydric alcohol may be used such as, for example, ethylene glycol, propylene glycol, 1,4-butane diol, 1,3-butane diol, 1,6-hexane diol, dodec-9,10-ene-1,12-diol, 2-ethyl hexane-1,3-diol, 2,4-dimethyl-2-propyl heptane-1,3-diol, 2-butene-1,4-diol, 2-butyne-1,4-diol, diethylene glycol, triethylene glycol, glycerine, hexane-1,2,6-triol, triethanolamine, pentaerythritol, quinitol, sorbitol, hexahydropyrocatechol, 4,4'-dihydroxydicyclohexyl dimethylmethane, N-methyl diethanolamine and the like and mixtures thereof.

Also, polyhydroxy carboxylic acids, amino carboxylic acids, lactams and/or lactones may be used in the preparation of the polyesters including recinoleic acid, hydroxystearic acid, as well as dimerized and trimerized unsaturated fatty acids. The term "polyester" also includes polyester amides which may be obtained by including some amine such as ethylene diamine or one of the above-mentioned amino carboxylic acids in the reaction mixture.

As indicated above, the organic compound containing active hydrogen-containing groups may be in the form of a polyacetal. Any suitable polyacetal may be used such as, for example, the reaction product of an aldehyde with a polyhydric alcohol. Any suitable aldehyde such as, for example, formaldehyde, paraldehyde, butyraldehyde and the like may be used. Any of the polyhydric alcohols mentioned above in the preparation of the polyester may be used to prepare polyacetals.

Additionally, the polyamine may be any suitable polyamine such as, for example, ethylene diamine, aniline, $p$-aminoaniline, polymers of the type set forth above which have terminal primary or secondary amino groups and the like and mixtures thereof.

The polyamides which can be utilized in accordance with the present invention are linear polymers having repeating carbodiamide groups as an integral part of the polymeric chain, for example, a polycarboxylic acid and polyamine, such as dicarboxylic acid and alkylene diamine. In addition, such polyamides can be prepared through the condensation polymerization of lactams. Similarly, the polyester amides utilized in accordance with the present invention can be prepared by conventional block copolymerization techniques.

In addition to the use of each of the above organic compounds containing active hydrogen-containing groups reactive with NCO groups, it is obvious that the polyurethanes or polyureas of the present invention can be produced from mixtures of organic compounds. Accordingly, it is quite possible to employ, for example, mixed ether-ester reactants in the production of the polyurethane.

Linear or branched polyhydric polyalkylene ethers and esters may be used, but the linear forms are favored, and the polyethers are used exclusively in the preparation of the high-resilience cold cured foams.

The hard segment source of NCO groups for reaction with the active hydrogen reactants present in the reaction mixture is an organic polyisocyanate, and preferably a diisocyanate. Illustrative polyisocyanates, which are used alone or in admixture, are aliphatic diisocyanates of the general formula, OCN-R-NCO, wherein R represents a linear or branched, saturated or unsaturated alkylene radical, which can also be interrupted by hetero atoms such as oxygen or sulfur. Examples of these are tetra-or hexa-methylene diisocyanates, butene diisocyanates, dithiodiethyl or thiodipropyl diisocyanates, 2,2-dimethylpentane diisocyanate, omega,omega'-dipropyl-ether diisocyanate, 1,4-butylene glycol dipropyl ether diisocyanate and the like. Aliphatic diisocyanates with built-in ring systems such as, for example, omega,omega'-diisocyanato-1,4-dimethylcyclohexane, omega,omega'-diisocyanato-1,4-diethyl benzene and the like and mixtures thereof may also be utilized in this context.

Hydroaromatic diisocyanates may be the organic polyisocyanate such as cyclohexane-1,3 or cyclohexane-1,4-diisocyanates, 1-methyl-cyclohexane-2,4-diisocyanates, dicyclohexyl methane-4,4'-diisocyanate, 2,2'-dimethyl-dicyclohexyl methane-4,4'-diisocyanate and the like and mixtures thereof.

Aromatic-aliphatic or aromatic-hydroaromatic diisocyanates may be the organic polyisocyanate such as 4-phenyl isocyanato-β-ethyl isocyanate, hexahydrobenzidine-4,4'-or hexahydrodiphenyl methane-4,4'-diisocyanates, 3-phenyl isocyanato-α-ethyl isocyanate and the like and mixtures thereof.

Diisocyanates of benzene and its homologues such as 1,3- or 1,4-phenylene diisocyanates, 1-alkyl benzene-2,4-, 2,6-, 2,5-, 3,5-diisocyanates, 2,4-and 2,6 diisocyanates, e.g, tolylene, 1-methyl-3,5-diethylbenzene-2,4-diisocyanate, diisopropyl benzene diisocyanate and the like may be used, and mixtures thereof.

Diisocyanates of substitution products of benzene may be used, such as, for example, 1-chlorobenzene-2,4-diisocyanate, dichloro-benzene diisocyanates, 1-nitrobenzene-2,4-diisocyanate, 1-methoxy-benzene-2,4-diisocyanate, azobenzene-4,4'-diisocyanate, diphenylether-4,4' diisocyanate and the like and mixtures thereof. Diisocyanates of naphthalene such as napthalene-1,4, 1,5- and 2,6-diisocyanates of biphenyl or deriving from diphenylmethyldiphenyl-4,4'diisocyanate, diphenylmethane-4,4'-diisocyanate, diphenyldimethylmethane diisocyanates, benzophenone-3,3'-diisocyanate and the like may be used, and mixtures thereof. In addition, diisocyanates of polynuclear ring systems such as 1,5-naphthalene diisocyanate and the like sulphur-containing aromatic diisocyanates, such as p,p'-diisocyanatodiphenyl sulfide, triisocyanates and tetraisocyanates, such as 1-methyl-benzene-2,4,6-triisocyanate, triphenyl methane-4,4'4'''-triisocyanate, 2,2'4,4'-diphenylmethane tetraisocyanate and the like and mixtures thereof are also used.

Of particular value as the hard segment source of NCO groups in preparing cellular foams, and particularly flexible slabstock, including high-resilience foams, is an aromatic diisocyanate, in part because of its tendency to form dimers and trimers, and specifically tolylene diisocyanate or polymethylene polyphenyl polyisocyanate of the general formula:

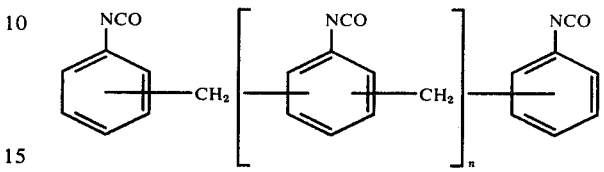

wherein $n$ is predominantly an integer generally of 1 or 0 or a mixture wherein $n$ is primarily 1 in a preferred embodiment and to a lesser extent 0, and thus the trimer, dimer or mixtures thereof, and where this isocyanate is used in an undistilled state, may include residual or trace quantities of high polymers as well. The preferred composition is one containing an excess of 50 percent by weight of trimer, in excess of 40 percent by weight of dimer and less than 5 percent of higher polymers, e.g. $n$ is an integer of from about 4 to 8. The foregoing polymethylene polyphenyl polyisocyanates are referred to for convenience hereinafter as "PPI."

The tolylene diisocyanate used generally is an undistilled blend as well as a distilled mixture with a ratio by weight in either event of eighty parts of 2,4-tolylene diisocyanate and about twenty parts by weight of 2,6-tolylene diisocyanate (referred to hereinafter as "TDI").

The ratio by weight of PPI to TDI, where both are present, is within the range of 1 to 2 and preferably about 1.5 to 2 parts of the former to one part of the latter. The ratio of PPI to TDI is critical within the foregoing range since a higher percentage of the generally more reactive PPI will tend to induce excessive cross-linkage principally as allophanate and biuret linkages in the product foam and consequently decrease its desired resilience. The ratios recited tend to achieve maximum resiliency of the foam product consistent with foam stability.

The preferred flexible cellular polyurethane foams of the invention are prepared by a conventional one-shot process wherein the 2,3-dibromo-2-butenediol-1,4 is substituted as the chain extender and fire-retardant component, and a phosphorus-containing compound of the general formulae I, II and III referred to hereinabove and discussed in detail hereinafter is included.

The use of 2,3-dibromo-2-butenediol-1,4 replaces toxic curing agents such as 4,4'-methylene bis (2-chloroaniline) without otherwise adversely affecting the desirable properties of the foam product.

The high-resilience foams prepared according to the invention are flexible polyether urethanes possessing inter alia a comfort or sag factor as measured by ASTM D-1564–69 of at least 2.5 and preferably 2.8 to 3.1. This factor is the ratio of the indent load deflection ("ILD") at 65 percent deflection to the ILD at 25 percent deflection. Indent load deflection is a measure of the firmness of load-bearing properties of a flexible foam.

Sag or ILD factor and compression set are controlled by the composition of the foam and to a lesser extent the conditions under which the foam's components are reacted.

Hysteresis, the measure of the energy lost or absorbed by a foam when subjected to deformation, and loadbearing characteristics are also significant and materially different from those of conventional foams. Low hysteresis values (the ratio of the load at 65 percent return to the load at 25 deflection or indentation) are normally found in the case of high-resilience foams prepared as described herein, as are height, and hardness resistance or fatigue, which are generally less then 1 percent and 20 percent respectively.

Of coordinate significance in high-resilience foams is the compression set of the foam product. Compression set is a measure of the resistance of the foam to permanent deformation. Compression sets of 75 percent and up to 90 percent are characteristic of the high-resilience foams of this invention. The test procedure characteristically employed for determining compression set is ASTM 1564.

These highly resilient polyether urethane foams prepared by a one-shot process employ a mixture of polyols having a molecular weight of at least about 4,000 and preferably within the range of 4,000 to 7,000; one or more aromatic polyisocyanates, particularly tolylene diisocyanate and methylene diphenyl isocyanate in amounts sufficient to result in trace amounts of the trimers thereof in said reaction product with or without an auxiliary blowing agent; a silicone surfactant, amine catalysts appropriate to a one-shot polymerization of the reactants; and 2,3-dibromobutenediol-1,4.

The chain-extender of the invention, 2,3-dibromo-2-diol-1,4 is utilized in preference to, for example, its corresponding saturated compound as a result of the discovery of its combination of fire retardant characteristics, resistance to dehydrobromination, and scorching, reduced smoke emission, and reduced susceptibility to humid aging deterioration in combination with its ability to replace, for example, 4,4'-methylene bis(2-chloroaniline) without adversely affecting the properties of high-resilience foams in which it is reactively incorporated although the number of urea linkages present in the foam product will be substantially reduced by virtue of this substitution.

The single, most preferred phosphorus-containing compound coming within the scope of invention is that embraced by the general formula:

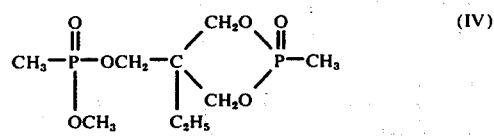

(IV)

Other preferred phosphorus-containing compounds for use herein include the following:

(V)

(VI)

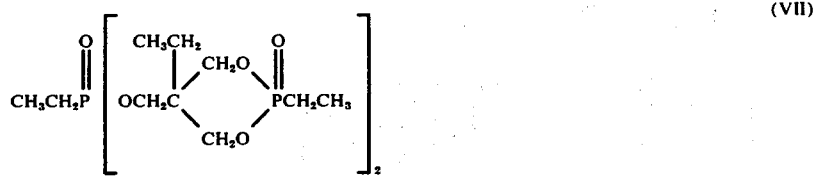

(VII)

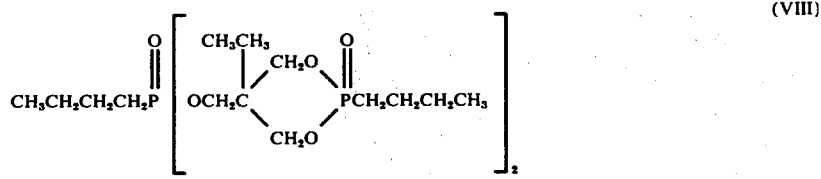

(VIII)

(IX)

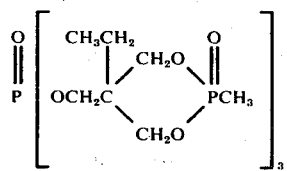 (X)
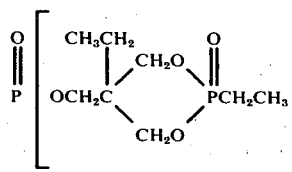 (XI)
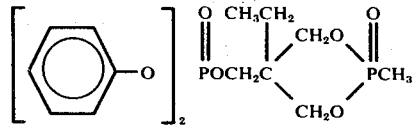 (XII)
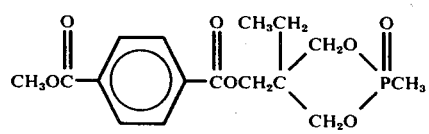 (XIII)
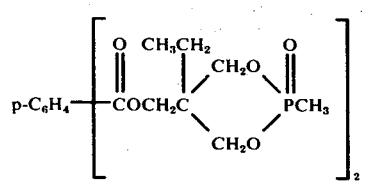 (XIV)
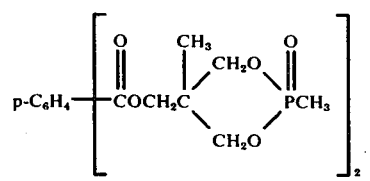 (XV)
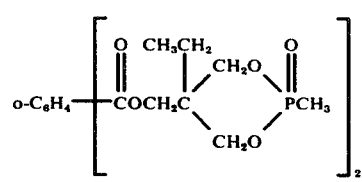 (XVI)
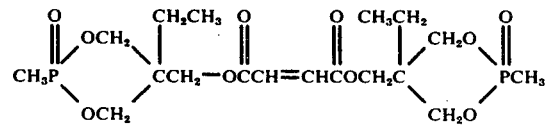 (XVII)
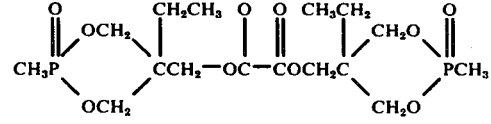 (XVIII)
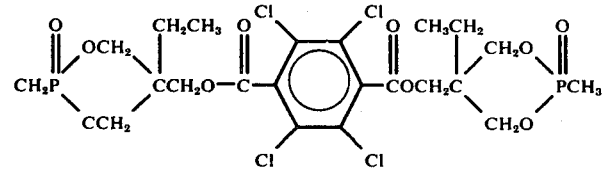 (XIX)

-continued

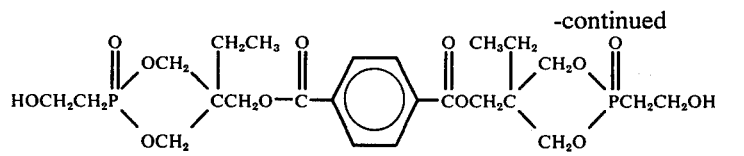 (XX)

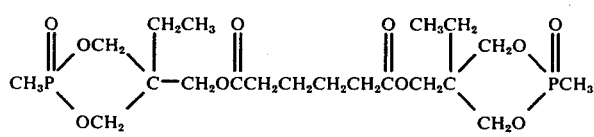 (XXI)

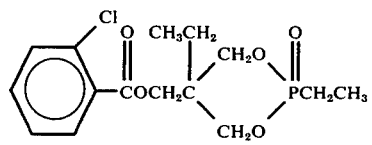 (XXII)

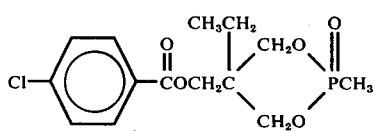 (XXIII)

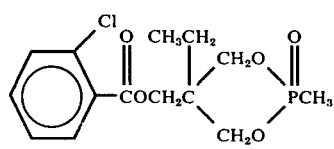 (XXIV)

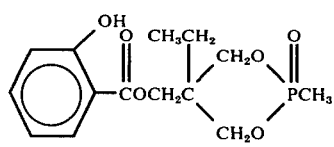 (XXV)

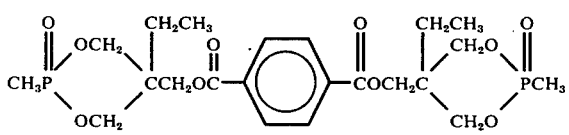 (XXVI)

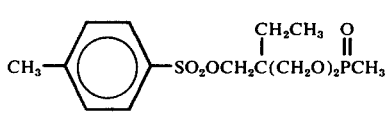 (XXVII)

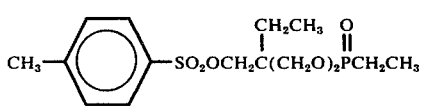 (XXVIII)

The foregoing illustrative phosphorus-containing compounds contemplated by the present invention's general formulae I, II and III above, as well as their method of preparation, are identical or similar to those described in Offenlegungschrift 2,255,971 of the Federal Republic of Germany bearing an Offenlegungstag of May 24, 1973. Dimethyl methyl phosphonate may occur in admixture with the foregoing phosphorus-containing compounds in small or trace quantities, but its presence or absence will not affect the practice of the invention.

As will be evident the phosphorus-containing compounds coming within the ambit of this invention may themselves contain a chlorine moiety attached to any aromatic nucleus forming part of the phosphorus-containing molecule.

In the foregoing quantities, the compositions of the invention provide as noted elsewhere herein a fire retardant effect, reduced smoke emission, and other desirable physical and mechanical properties, for example, improved resistance to discoloration, a tendency to poor moldability and the like, superior to that of products having the conventional relationship of phosphorus and bromine described by the formula P + Br/10 = 1.5. The bromine content on a weight basis in 2,3-dibromobutene2-diol-1,4 is about 65 percent.

It is preferred in accordance with the present invention that the polyurethane products have a molecular weight of at least 15,000 in order to provide foam products of sufficiently high strength. To achieve this molecular weight it is important that the consideration reaction be carried out with a carefully determined ratio of NCO groups to —OH or other active hydrogen groups in the reaction mixtures of the one-shot process so that there is preferably an excess of —NCO groups to reactive hydrogen (referred to hereinafter for convenience as the NCO/OH ratio). A preferred NCO/OH ratio is by weight from about 1 to 1.15 parts of NCC groups to 1 part of reactive hydrogen (expressed as OH component). An NCO/OH ratio of 0.95 to 1.15:1 is however practicable. The ratio is that, in any event, which should result in trace amounts of polymerized isocyanate, less than five percent (5%) by weight of the isocyanate charged to the reaction, predominantly, for example, as trimerized TDI and partially polymerized PPI, in the product foam.

The brominated diol, 2,3-dibromo-2-butenediol-1,4, in addition to the other purposes served by it, provides sufficient OH moieties to the reaction mix to assure the desired NCO/OH ratio discussed hereinabove.

To prepare a variety of polyurethanes such as film, spandex fibers, coatings or the like according to the practice herein described, it is not essential to use accelerators, catalysts or the like. Where however the preferred cellular foam products are being produced, the inclusion of several conventional additives as well as catalysts is appropriate or necessary, and the application of the invention thereto is a result unique. For example, the preparation of these cellular products necessitates the employment of a suitable foaming or blowing agent. Carbon dioxide derived from water added to the reaction system is the most desirable agent for the purpose of securing cellular formation and expansion. The water will also serve as an added source of active hydrogen in the reaction system. Conventional halocarbons, such as the haloalkanes, e.g. monofluorotrichloromethane and trichlorofluoromethane, may also be so utilized to lower density but are normally omitted in that their presence invites a proportional diminution in load-bearing capacity.

Although various fillers can be incorporated into the herein described polyurethanes such as hydrargylitt, zircon sand and barytes, ground quartz or sand, clay, bentonites, kaolinites, wood cellulose, calcium carbonate, finely chopped glass fiber, short fibrous polyester, nylon or acrylics, mica, asbestos and glass microballoons, the use of these fillers usually has a detrimental effect on the properties of the polyurethane product, illustratively, tear strength and tensile properties and, in the case of cellular foams, on foam tensile strength, tear strength, compression set and other mechanical properties. It has now been found unexpectedly that calcium silicate and specifically acicular calcium metasilicate (marketed by Interpace Corporation under the trade name WOLLASTONITE) may be incorporated in polyurethanes and particularly cellular foams without incurring the disadvantages inherent upon incorporation of the mineral and other fillers referred to above. Indeed, this calcium metasilicate has been found to be a reinforcing agent, improving the tear strength, tensile strength and load bearing properties of the polyurethane to which it is added. Additionally, and significantly, calcium metasilicate, when used as a filler, obviates the slower catalysis and tack-free times so characteristic of mineral fillers, such as calcium carbonate, and the like. The percentage of filler included in any event is normally within the range of five percent to sixty percent, and preferably from about twenty percent to fifty percent, by weight of the polyurethane.

Conventional silicone surfactants are desirably, but not necessarily, incorporated in the reaction system of the invention in order to stabilize, in conjunction with the catalysts present, the cellular foam product. The surfactant may be added with any of the two to six streams usually fed to the mixing head in the one-shot process.

The amount of silicone surfactant utilized is on a weight basis of normally about 0.8 to 1.5 part, and preferably about 1.0 part, silicone to each 100 parts of polyol present with, additionally, about 0.1 to 0.5, and preferably about 0.2 part, silicone for each 0.5 part water above the usual concentration of 3.5 parts of water by weight of the total reaction system. The concentration of water will normally not exceed 4 parts by weight of the total system however and preferably will be retained within the range of 2.5 to 3.5 parts to each 100 parts of polyol.

The catalysts employed in preparing these cellular products and particularly the flexible foams, that is the slabstock of conventional properties except as modified by the practice of this invention, and high-resilience foams are well known and are usually tertiary amines or combinations thereof. These amines, while water-isocyanate catalysts (and thus primarily responsible for foam production), also have a substantial and efficacious effect on polymer formation, which however varies with the particular amine employed. Most effective in polymer formation of these amines is 1,4-diazabicyclo [2.2.2] octane. Additional amine catalysts which may be used alone or preferably in combination with each other and most desirably with the foregoing diazabicyclooctane are illustratively, dimethyl ethanolamine, N-ethylmorpholine, cyclohexylamine derivatives, and particularly the ethoxylates thereof, and dimethylaminoethyl ether (the latter in solution in dipropylene glycol).

The use of conventional metal organic catalysts such as stannous octoate, which tend to promote the reaction between the polyol hydroxy moieties and the diisocyanates, is not therefore essential to the formation of the high-resilience foams by a one shot process although they may be used if desired in combination with one or more of the foregoing amines. More favorable hysteresis retention values are believed to be obtained in the product foams, however, by avoidance of the organotin catalysts.

Methods of producing the various polyurethanes coming within the compass of this invention, except as specifically provided herein, are well known and require no elaboration.

Thus, any storage system that can hold reagents in the non-reactive state can be used to hold appropriate requirements of the various reactants described herein for preparation of thermoplastic polyurethane resins. Any standard metering device that will feed substantially stoichiometric quantities, or such variations thereof as described herein, and the desired proportions of phosphorus- and bromine-containing compounds of NCO and OH is functional for the purpose of producing the polyurethanes of the invention.

The mixer should ideally homogenize completely the phosphorus, bromine, hydroxyl and NCO feed streams. However, the polymerizer can normally function to overcome some inhomogeneities. The mixture should be preheated (120° C) to avoid plate out of reactants when the system is started up. The residence time in the mixer must be sufficiently short to avoid polymer build-up within the mixer (10 to 20 seconds less). Almost any polyurethane mixer should work: a) mechanically agitated high shear helix; b) high pressure low speed mixer, T mixers relying on turbulent flow for mixing; or c) a combination mechanical high velocity inlet gas system.

The polymerizer itself can be any device which will maintain the polyurethane in a molten state, 100° C. for very soft polymers to 200° C. for higher melting ones. The 180°–195° C. range is preferred as being not too high to decompose the polyurethane yet sufficiently high to permit a moderately short residence time for affecting complete polymerization. Depending on speed of polymerization, 1 min. to 15 min. residence may be needed. The shorter time would pertain to catalyzed systems or amine extended polyurethanes which react very rapidly. The longer time would be needed for sluggish reactants, e.g. aliphatic isocyanates or hindered diols. In most work, 3 to 5 min. residence time is utilized. An important reactor feature is virtually complete elimination of dead spots and other areas where molten polymer would be held up for 15 min. or more. Dibromobutenediol polyurethanes, even stabilized, will turn brown if left in contact with hot reactor or die surfaces for prolonged periods of time. These "char" deposits gradually work free and deposit themselves in the polymer mainstream contaminating the product. Use of self-wiping screws or blades can be a satisfactory way of preventing undesirable build-up within the polymerizer. In practice most char problems arise in the die affixed to the exit of the polymerizer.

With respect to methods of producing one-shot flexible polyurethane foams commercially, including high-resistance polyether urethane foams and flexible slab-stock (the latter conventional in contrast to high-resilience foams except for the additives provided herein and the significantly improved properties resulting therefrom), equally well known processes are available which, however, include numerous processing variables such, for example, as the machines used, mixer speeds, steam temperatures, conveyor speeds and angles, well known to those skilled in the art. The process will, for example, go forward in production of slabstock desirably at ambient or slightly elevated temperatures such as 70° F to 120° F in the mixing head. The cream time, that is, the period of time required for the generated carbon dioxide to saturate the reaction mixture is normally in the range of 10 to 20 seconds.

In a standard one-shot operation each component of the formulation is admitted to the mixing head through individual feed lines at a predetermined ambient temperature. The silicone component can, however, be added to any of the streams, usually two to six in number, leading to the mixing head. Often, too, the number of feed lines entering the head is reduced by introduction of the catalyst or other components used only in small amounts, into the polyol line upstream from the mixing head. An inline blender may be used to premix the components of the reaction system before they reach the mixing head. Regular calibration of the component streams is of considerable assistance in determining metering efficiency. Orifice opening control, back pressure in the mixing head, pouring procedures, and related steps are also adjusted within well-known, flexible and discretionary parameters.

Illustrative processing conditions and apparatus for use in manufacturing molding and slabstock high-resilience foams is described illustratively in Patten et al, High Resiliency Foams Made with Polymer Polyols, Journal of Cellular Plastics, pages 92 to 98, March/April 1973, and particularly Table 1 thereof.

Various processing limits for production of high resilience molded foams are disclosed, also by way of illustration, in Wolfe, Jr. H. W., Designing High Resilience Molded Foams, Journal of Cellular Plastics, pages 134–138, May/June 1973.

The replacement of 4,4′-methylene bis (2-chloroaniline) as a chain extender by 2,3-dibromo-2-butenediol-1,4 has a significant advantage in that it does not require alteration of the standard processing steps. The brominated butenediol may also be incorporated conveniently into the polyol line upstream from the entry of the latter into the mixing head. The chain extension of the polyether urethane polymer secured by the brominated butenediol is at least equivalent to that of 4,4′-methylene bis (2-chloroaniline). In addition, there is imparted a stability to dehydrobromination and scorching sufficient to qualify the high-resilience foam of which the brominated butenediol is at least equivalent to that of 4,4′-methylene bis (2-chloroaniline), supplementing the self-extinguishing characteristics measured for example by ASTM D-1692 and non-burning properties measured by Motor Vehicle Saftey Standard 302.

The quality of NH groupings derived from the isocyanate present in the polyether urethanes of the invention, is not narrowly critical. These groupings may be present illustratively in amounts by weight of 2.5 percent to 6.0 percent and provide excellent tensile strength and associated physical properties but lesser and greater percentages may also be present without any materially adverse effect resulting.

The following examples are further illustrative of the invention. As employed in these examples and in the appended claims, all parts, proportions, and percentages are by weight unless otherwise expressly indicated.

Example I

This example illustrates the preparation of a high-resilience cold-cure polyether urethane foam according to the practice of the invention.

Table I

| Component | Weight phr* | grams |
|---|---|---|
| Polyol (Union Carbide NIAX 34-28)** | 47.5 | 1073 |
| Polyol (Union Carbide NIAX 11-27)*** | 47.5 | 1073 |
| 2,3-dibromo-2-butenediol-1,4**** | 5.0 | 112.95 |
| water | 3.0 | 67.73 |
| Phosphorus-containing compound of general formula IV hereinabove | 1.0 | 22.58 |
| 70 percent by weight solution of 2-dimethylaminoethyl ether in dipropylene glycol (NIAX A-1) | 0.1 | 2.26 |
| 33 percent by weight solution of 1,4-diazabicyclo [2.2.2] octane in dipropylene glycol (Air Products Corp., Chemical Additives Division) | 0.3 | 6.78 |
| dibutyltin dilaurate (M&T Chemicals Corp. T-12) | 0.1 | 2.26 |
| Silicone surfactant (Union Carbide Silicone L-5303) | 1.5 | 33.88 |
| TDI | 32.99 | |
| PPI (Upjohn's PAPI)***** | 8.25 | |

*parts per one hundred parts by weight of polyol.
**a poly(oxypropylene)-vinyl copolymer having a molecular weight of about 4500 and a triol content of about 70 weight percent and diol content of about 30 weight percent.
***A polypropylene oxide having a major portion of triol and a minor proportion of diol and a molecular weight of about 4000 to 5000.
****molecular weight of about 246.
*****equivalent weight: 130.

The polyols, 2,3-dibromo-2-butenediol-1,4, catalysts, phosphorus-containing component and silicone surfactant were heated to 60° C with stirring to dissolve the brominated butenediol. The mixture was sequentially cooled to 40° C and then further admixed with TDI in a Martins-Sweet type of polyurethane foam machine.

The resulting mixture was poured into a tetrafluoroethylene-lined mold. The mixture creamed in 7 seconds. The foam rise was completed in 60 seconds. The foam was cured to ambient temperature for a period of 15 minutes.

The resulting cellular high-resilience product manifested the following properties when measured by the indicated ASTM test methods:

Table II

| Property | ASTM Procedure | Determination |
|---|---|---|
| Resiliency, % | D-1564-71 | 40.3 |
| ILD$^{(1)}$ 25% | D-1564-71 | 12.05 |
| ILD$^{(1)}$ 65% | D-1564-71 | 39.84 |
| Oxygen Index | D-2863-70 | 23.8 |
| Steam (average) | D-1564-71 | 4.56 |
| Compression set (average) | D-1564-71 | 85.72 |

$^{(1)}$Indent Load Deflection

The foregoing properties qualify the resulting foam for use as a deep foam molded seat cushion in the United States automative industry. The oxygen index of 23.8 indicates an efficacious degree of flame retardancy. In the absence of the dibromobutenediol and phosphorus compound, an oxygen index of 18.8 was obtained which fails to qualify the foam for use in the automotive industry. Adapting the ratio of phosphorus and bromine content of the formulation of Table I to the formula, $P + Br/10$, it is found that the relationship may be stated as $0.15(P) + (2.29/10)(Br) = 0.38$. This result contrasts with the value of 1.5 for the combination of phosphorus and bromine required in standard combinations of phosphates and bromine-containing compounds known heretofore. Further, in comparative tests in which the only significant variable was the absence of a phosphorus-containing compound of the invention, significantly higher concentrations of the brominated diol are necessary to effect a similar fire retardancy.

Example II

This example illustrates the preparation of a further high-resilience polyether urethane foam produced in accordance with the invention.

The following catalysts and reaction components in the amounts recited were employed in the one-shot foam preparation of this example.

Table III

| Component | Weight (phr) |
|---|---|
| Polyol (Union Carbide polyol LC-34)* | 95 |
| 2,3-Dibromo-2-butenediol-1,4 | 5 |
| Water | 3.0 |
| Reaction product of cyclohexylamine and an alkylene oxide, e.g. propylene oxide (Abbott Laboratories Polycat 12) | 0.4 |
| 33 weight percent solution of 1,4-diazabicyclo [2.2.2] octane, in dipropylene glycol (Air Products Corp., Chemical Additive Division) | 0.15 |
| 70 weight percent solution of 2-dimethylaminoethyl ether in dipropylene glycol (Union Carbide NIAX A-1) | 0.15 |
| Silicone surfactant (Union Carbide silicone L-5303) | 1.5 |
| Phosphorus-containing compound of structural formula IV hereinabove | 1.0 |
| TDI | 17.14 |

Table III-continued

| Component | Weight (phr) |
|---|---|
| PPI (Upjohn's PAPI 901)** | 31.87 |

*molecular weight: 4781.4
**equivalent weight: 130

The reactants listed in Table III were mixed in a manner similar to that described in Example I. The mixture creamed, the foam rise was completed and the foam cured in the manner described in Example I, except that a Martin Sweets Modern Module 2-foam machine was employed. The oxygen index obtained was 23.2 using a level of 0.14% phosphorus and 2.14% Br. Again, when these results are compared with the conventional phosphorus-bromine relationship i.e., a value of 1.5 in the formula, $P + Br/10$, a higher degree of fire retardancy with a decreased total amount of phosphorus and bromine present is found with the consequent advantages derived therefrom such as significantly decreased smoke emission. This therefore allows production of the foam at lower flame retardant levels and thereby significantly reduces the smoke emission.

Example III

This example illustrates the preparation of a flexible slabstock foam of conventional resiliency but differing from standard foams by virtue of its inclusion of the phosphorus and bromine-containing compounds of the invention.

The following catalysts and reaction components in the amounts recited were employed in the one-shot foam preparation of this example.

Table IV

| Component | Weight (phr) |
|---|---|
| Polyol (Union Carbide polyol LG56)* | 90.0 |
| 2,3-Dibromo-2-butenediol-1,4 | 6.0 |
| Water | 4.0 |
| Silicone surfactant | 0.5 |
| Phosphorus-containing compound of structural formula IV above | 2.0 |
| 70% solution in dipropylene glycol of dimethylaminoethyl ether (Union Carbide NIAX A-1) | 0.18 |
| Stannous octoate, 50% in dioctyl phthalate (M&T Chemicals' T-10) | 0.2 |
| TDI | 53.9 |
| Cl$_3$CF (auxiliary blowing agent) | 3.0 |

The process of foam formation and curing described in Example II was repeated. This foam was found to have an oxygen index of 23.4. The level of phosphorus present was 0.28 weight percent and of bromine, 2.5 weight percent; thus indicating a foam of desirable fire retardant characteristics yet having a surprisingly small concentration of bromine and phosphorus as evident from the equation $0.28(P) + (2.5/10)(Br) = 0.53$. The foam was rated as self-extinguishing by ASTM test D1692 and physical properties were not adversely affected by these levels of fire retardent.

Example IV

This example illustrates the practice of the invention in the manner of Example II but varying the proportions of fire retardant brominated diol.

The process of Example III was repeated in all salient details as to the components, the amounts thereof, and the procedure of foam production followed with the exception of the amount of 2,3-dibromo-2-butenediol-1,4 incorporated, which was increased to 13.3 phr whereas the polyol was decreased to 86.6 phr. The properties of the resulting foam were similar to those secured in Example III.

Example V

This example illustrates the practice of the invention utilizing variable quantities of the desired components to form high-resilience foams according to the invention.

The process of Example I was repeated substantially with substitution of the components in the amounts recited in Table V.

Table V

| Component | Weight (phr) Run 1 | Weight (phr) Run 2 |
|---|---|---|
| Polyol (NIAX 34-28) | 45 | 45 |
| Polyol (NIAX 11-27) | 45 | 45 |
| 2,3-dibromo-2-butenediol-1,4 | 10 | 10 |
| Phosphorus-containing compound of structural formula IV | 3.67 | 1.84 |
| Water | 3.0 | 3.0 |
| Calcium silicate (Wollastonite P-15) | 20.0 | 20.0 |
| Bis(2-dimethyl amino ethyl) ether, 70% weight solution in dipropylene glycol (NIAX A-1) | 0.1 | 0.1 |
| 1,4-Diazabicyclo[2.2.2] octane, a 33 weight percent solution in dipropylene glycol (DABCO 33 LV, Air Products Corp., Chemical Additives Division) | 0.3 | 0.3 |
| Dibutyltin dilaurate (M&T T-12) | 0.1 | 0.1 |
| Silicone surfactant (Union Carbide L-5302) | 1.5 | 1.5 |
| TDI | 34.28 | 34.28 |
| PPI (Upjohn PAPI) | 8.57 | 8.57 |

These products again evidenced unexpectedly desirable flammability properties while having the following phosphorus (P) and bromine (Br) levels or values coming within the scope of the invention:

| Run 1 | Run 2 |
|---|---|
| $0.47\,(P) + \frac{3.9}{10}\,(Br) = 0.86$ | $0.24\,(P) + \frac{3.9}{10}\,(Br) = 0.63$ |

Example VI

This example illustrates the practice of the invention utilizing variable quantities of the desired components according to the practice of the invention to again form high-resilience polyether urethane foams of significantly improved flammability characteristics and reduced smoke emission properties.

The process of Example II was repeated substantially with substitution of the components, and in the amounts indicated, in Table VI as follows:

Table VI

| Components | Weight (phr) Run 1 | Weight (phr) Run 2 |
|---|---|---|
| Polyol (Union Carbide NIAX LC-34) | 95.0 | 95.0 |
| 2,3-Dibromo-2-butenediol-1,4 | 5.0 | 5.0 |
| Water | 3.0 | 3.0 |
| Cyclohexylamine-alkylene oxide (propylene oxide) reaction product (Polycat 12) | 0.4 | 0.4 |
| Bis (2-dimethyl amino ethyl) ether, a 70 weight percent solution in dipropylene glycol (NIAX A-1) | 0.2 | 0.2 |
| 1,4-Diazobicyclo[2.2.2] octane, a 33 weight percent solution in dipropylene glycol (DABCO 33LV) | 0.2 | 0.2 |
| Silicone surfactant (Union Carbide L-5305) | 1.5 | 1.5 |
| Phosphorus-containing compound of structural formula IV above | 3.67 | 1.84 |

Table VI-continued

| Components | Weight (phr) Run 1 | Weight (phr) Run 2 |
|---|---|---|
| TDI | 17.14 | 17.14 |
| PPI (PAPI 901) | 31.87 | 31.87 |

The 2,3-dibromo-2-butenediol-1,4, employed in these examples is normally and substantially trans-2,3-dibromo-2-butenediol-1,4 but it is intended to encompass 2,3-dibromo-2-butenediol-1,4 within the scope of this invention regardless of its steric configuration and whether present in a single isomeric foam or mixture thereof.

It will be evident that the terms and expressions which have been employed are used as terms of description and not of limitation. There is no intention in the use of such terms and expressions of excluding equivalents of the features shown and described or portions thereof and it is recognized that various modifications, by way of illustration, but not of limitation, variations in proportions, procedures and materials are possible within the scope of the invention claimed.

What is claimed is:

1. The process of producing a polyurethane that comprises reacting an halogenated polyether or polyester polyol, an organic polyisocyanate, 2,3-dibromo-2-butenediol-1,4, and a phosphorus-containing compound selected from the formulae:

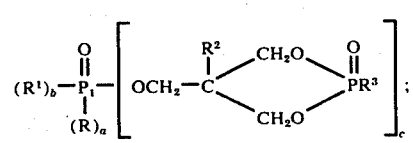

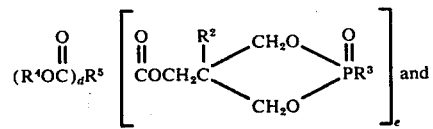

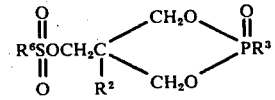

and mixtures thereof; wherein each of a and b has a value of 0 to 2 inclusive; c is an integer of from 1 to 3 and the sum of $a$, $b$, and $c$ is 3; each of R and $R^1$ is an alkyl, alkoxy, aryloxy, alkaryl, alkaryloxy, aralkyl, aryloxyalkoxy, or aralkoxy radical wherein each of said alkyl moieties is unsubstituted or hydroxy-substituted; and each of any aryl portion of said radical is an unsubstituted, or hydroxy- or chlorine-substituted aromatic hydrocarbon; $R^2$ is an alkyl, hydroxyalkyl, or unsubstituted aromatic hydrocarbon radical; $R^3$ is an alkyl or hydroxyalkyl radical; $d$ has a value of from 0 to 2 inclusive; $e$ is an integer of from 1 to 3 inclusive; and the sum of $d$ and $e$ is not in excess of 3; $R^4$ is an alkyl, aryl, alkaryl, aralkyl or aryloxyalkyl group wherein any aryl portion of said group is an unsubstituted, or chlorine- or hydroxy-substituted aromatic hydrocarbon; $R^5$ is an alkyl, alkylene, aryl or arylene radical; and each of said aryl and arylene radicals is an unsubstituted or chlorine- or hydroxy-substituted aromatic hydrocarbon moiety; and $R^6$ is an alkyl, aryl, alkaryl, aralkyl or aryloxyalkyl group wherein any aryl moiety present is an unsubstituted, hydroxy-substituted or chlorine substituted aromatic hydrocarbon moiety; and wherein said 2,3-dibromo-2-butenediol-1,4 and said phosphorus-containing compound are present in an amount sufficient to provide a final polymer containing weight percents of bromine (Br) and phosphorus (P) defined by the equation: $P + Br/10 \cong 0.1$ to $1.0$ and wherein P has a value of not less than 0.05 weight percent and Br has a value not less than 0.5 weight percent.

2. The process of claim 1 wherein said 2,3-dibromo-2-butenediol-1,4 and said phosphorus-containing compound are present in an amount sufficient to provide a final polymer containing not in excess of 0.95 weight percent of phosphorus (P) and not in excess of 9.5 weight percent of bromine (Br).

3. The process of claim 2 wherein P has a value of 0.14 weight percent and Br has a value of about 2.2 weight percent.

4. The process of claim 1 wherein said phosphorus-containing compound has the structural formula:

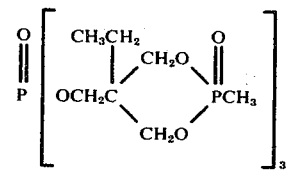

5. The process of claim 1 wherein said phosphorus-containing compound has the structural formula:

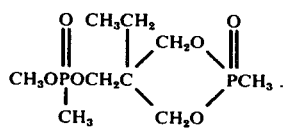

6. The process of claim 1 wherein said phosphorus-containing compound has the structural formula:

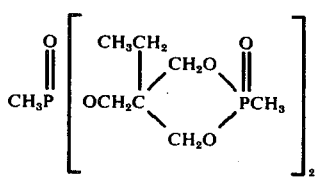

7. The process of claim 1 wherein said phosphorus-containing compound has the structural formula:

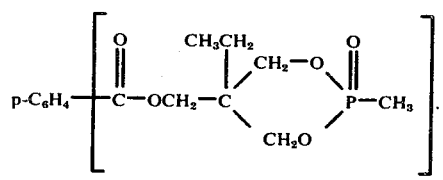

8. The process of claim 1 wherein said phosphorus-containing compound has the structural formula:

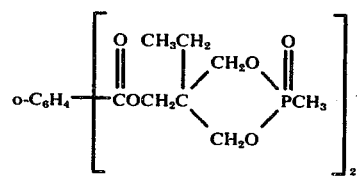

9. The process of claim 1 wherein said reaction takes place in the presence of a blowing agent and catalyst to produce a cellular polyurethane foam.

10. A polyurethane produced by reaction of an unhalogenated polyether polyol, an organic polyisocyanate, 2,3-dibromo-2-butenediol-1,4, and a phosphourus-containing compound selected from the formulea:

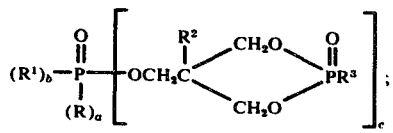

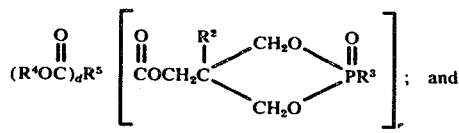

; and

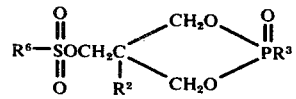

and mixtures thereof; wherein each of $a$ and $b$ has a value of 0 to 2 inclusive; $c$ is an integer of from 1 to 3 and the sum of $a$, $b$, and $c$ is 3; each of R and $R^1$ is an alkyl, alkoxy, aryloxy, alkaryl, alkaryloxy, aralkyl, arloxyalkoxy, or aralkoxy radical wherein each of said alkyl moieties is unsubstituted or hydroxy-substituted; and each of any aryl portion of said radical is an unsubstituted, or hydroxy- or chlorine-substituted aromatic hydrocarbon; $R^2$ is an alkyl, hydroxyalkyl, or unsubstituted aromatic hydrocarbon radical; $R^3$ is an alkyl or hydroxy-alkyl radical; $d$ has a value of from 0 to 2 inclusive; $e$ is an integer of from 1 to 3 inclusive; and the sum of $d$ and $e$ is not in excess of 3; $R^4$ is an alkyl, aryl, alkaryl, aralkyl or aryloxyalkyl group, wherein any aryl portion of said group is an unsubstituted, or chlorine- or hydroxy-substituted aromatic hydrocarbon; $R^5$ is an alkyl, alkylene, aryl or arylene radical; and each of said aryl and arylene radicals is an unsubstituted or chlorine- or hydroxy-substituted aromatic hydrocarbon moiety; and $R^6$ is an alkyl, aryl, alkaryl, aralkyl or aryloxyalkyl group wherein any aryl moiety present is an unsubstituted, hydroxy-substituted or chlorine-substituted aromatic hydrocarbon moiety; and wherein said 2,3-dibromo-2-butenediol-1,4 and said phosphorus-containing compound are present in an amount sufficient to provide by weight percent of the final product a sum total of bromine (Br) and phosphorus (P), defined by the equation: $P + Br/10 \cong 0.1$ to $1.0$ and wherein phosphorus (P) has a value of not less than 0.05 weight percent and bromine (Br) has a value of not less than 0.5 weight percent.

11. A polyurethane as claimed in claim 10 wherein said 2,3-dibromo-2-butenediol-1,4 and said phosphorus-containing compound are present in an amount sufficient to provide a final product comprising not in excess of 0.95 weight percent of phosphorus (P) and not in excess of 9.5 weight percent of bromine (Br).

12. A polyurethane as claimed in claim 11 wherein P has a value of 0.14 weight percent and Br has a value of about 2.2 weight percent.

13. A polyurethane as claimed in claim 10 wherein said phosphorus-containing compound has the structural formula:

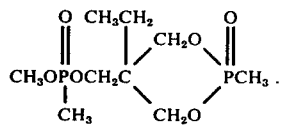

14. A polyurethane as claimed in claim 10 wherein said phosphorus-containing compound has the structural formula:

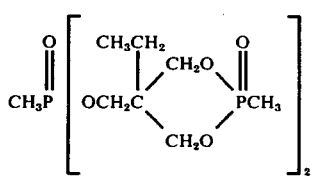

15. A polyurethane as claimed in claim 10 wherein said phosphorus-containing compound has the structural formula:

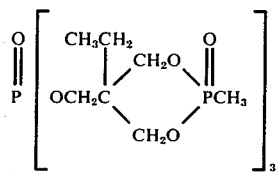

16. A polyurethane as claimed in claim 10 wherein said phosphorus-containing compound has the structural formula:

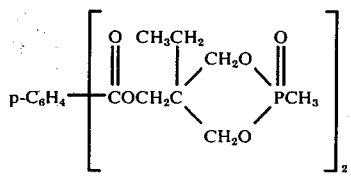

17. A polyurethane as claimed in claim 10 wherein said phosphorus-containing compound has the structural formula:

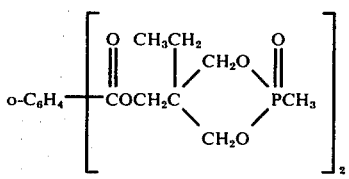

18. A polyurethane as claimed in claim 10 wherein said polyurethane is a cured, flexible, stable polyester or polyether urethane foam.

19. A polyurethane foam as claimed in claim 18 wherein said foam is a cured, stable, fire-retardant, high-resilience polyether urethane foam having a sag factor of at least 2.2.

20. A high-resilience polyether urethane foam as claimed in claim 19 having a sag factor of from about 2.4 to 3.1.

21. A high-resilience polyether urethane foam as claimed in claim 20 wherein said polyether polyol is a linear polyether triol.

22. A high-resilience polyether urethane foam as claimed in claim 21 wherein said polyether is a poly(oxypropoylene) triol having a molecular weight of at least 4000.

23. The high-resilience foam as claimed in claim 22 wherein said poly(oxypropylene) triol has a molecular weight of from about 4,000 to about 7,000.

* * * * *